(12) United States Patent
Fortier et al.

(10) Patent No.: US 12,377,967 B2
(45) Date of Patent: Aug. 5, 2025

(54) METHOD FOR PROTECTING THE LANDING GEAR OF AN AIRCRAFT AGAINST IMPACTS THAT MAY AFFECT IT

(71) Applicant: SAFRAN LANDING SYSTEMS, Velizy Villacoublay (FR)

(72) Inventors: Florent Fortier, Moissy-Cramayel (FR); Sébastien Dubois, Moissy-Cramayel (FR); Florent Dauphin, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 481 days.

(21) Appl. No.: 16/716,926

(22) Filed: Dec. 17, 2019

(65) Prior Publication Data
US 2020/0189726 A1     Jun. 18, 2020

(30) Foreign Application Priority Data

Dec. 18, 2018 (FR) ..................... 18 73262

(51) Int. Cl.
| | | |
|---|---|---|
| *B64C 25/20* | (2006.01) | |
| *B64C 25/24* | (2006.01) | |
| *F16C 41/00* | (2006.01) | |

(52) U.S. Cl.
CPC .............. *B64C 25/20* (2013.01); *B64C 25/24* (2013.01); *F16C 41/004* (2013.01); *F16C 2326/43* (2013.01)

(58) Field of Classification Search
CPC ....... B64C 25/20; B64C 25/24; F16C 41/004; F16C 2326/43; F16H 49/001; F16F 15/12; F16F 7/04; F16F 7/02
See application file for complete search history.

(56) References Cited

U.S. PATENT DOCUMENTS

| | | | |
|---|---|---|---|
| 2,148,972 A | 2/1939 | Waseige | |
| 2,451,109 A | 10/1948 | Nardone | |
| 2,476,376 A | 7/1949 | Laraque | |
| 2,701,478 A | 2/1955 | Riess | |
| 2,906,143 A * | 9/1959 | Walton | F16H 49/001 |
| | | | 74/625 |

(Continued)

FOREIGN PATENT DOCUMENTS

| | | |
|---|---|---|
| DE | 10 2016 219 816 A1 | 4/2018 |
| FR | 2 946 319 A1 | 12/2010 |

(Continued)

OTHER PUBLICATIONS

French Search Report for FR 1873262 dated Oct. 15, 2019.

*Primary Examiner* — Joshua D Huson
*Assistant Examiner* — Vicente Rodriguez
(74) *Attorney, Agent, or Firm* — Sughrue Mion, PLLC

(57) ABSTRACT

A method for protecting the landing gear of an aircraft against stroke-end shocks, the landing gear being manoeuvrable between a retracted position and a deployed position by means of a single electromechanical operating actuator (10) between these two positions. According to the invention, the method involves the step of equipping the electromechanical operating actuator with an internal damping device (17) arranged between an output shaft (18) of the electromechanical actuator coupled to the landing gear and a motor shaft (13) with a motor (12) of the electromechanical actuator.

10 Claims, 3 Drawing Sheets

(56) References Cited

U.S. PATENT DOCUMENTS

| | | | | |
|---|---|---|---|---|
| 9,470,301 B2* | 10/2016 | Kuo | ................... | F16H 49/001 |
| 10,787,247 B2* | 9/2020 | Klode | ................... | B64C 25/22 |
| 10,894,597 B2* | 1/2021 | Persico | ................... | B64C 25/24 |
| 2012/0037752 A1* | 2/2012 | Collins | ................... | B64C 25/26 |
| | | | | 244/102 R |
| 2013/0092482 A1* | 4/2013 | Keller | ................... | B64C 25/26 |
| | | | | 188/141 |

FOREIGN PATENT DOCUMENTS

| | | | |
|---|---|---|---|
| GB | 612462 A | 11/1948 | |
| GB | 779420 A | 7/1957 | |
| GB | 2489503 A | 10/2012 | |

\* cited by examiner

METHOD FOR PROTECTING THE LANDING GEAR OF AN AIRCRAFT AGAINST IMPACTS THAT MAY AFFECT IT

BACKGROUND OF THE INVENTION

Landing gears that move between a retracted and deployed position are known which are equipped with an electromechanical rotary actuator, as illustrated in document FR2946319.

Under some circumstances, such as a power failure, the landing gear is released from its retracted position and is left free to move to the deployed position under the influence of gravity and relative wind. During such deployment, the electro-mechanical operating actuator does not regulate the landing gear travel speed and the landing gear can reach the deployed position at a high speed, causing the landing gear to come to a sudden stop. Other shocks may occur, such as when the landing gear hits the ground during a landing. These shocks are likely to cause sudden stresses to go back to the operating actuator, which can damage it.

PURPOSE OF THE INVENTION

The invention aims to propose a method for protecting the landing gear of an aircraft against stroke-end shocks, making it possible to protect its electromechanical operating actuator against the risk of damage.

SUMMARY OF THE INVENTION

To achieve this goal, a method is proposed for protecting the landing gear of an aircraft against stroke-end shocks, the landing gear being manoeuvrable between a retracted position and a deployed position by means of a single electromechanical operating actuator. According to the invention, the method involves the step of equipping the electromechanical actuator for operation with an internal damping device arranged between an output shaft of the electromechanical actuator coupled to the landing gear and a motor shaft of a motor of the electromechanical actuator.

In this way, the electromechanical actuator is protected from shocks affecting the landing gear and going up to the actuator, particularly in the event of a sudden stop when reaching the deployed position.

BRIEF DESCRIPTION OF THE DRAWINGS

The invention will be better understood upon reading the following description of one embodiment of the invention, while referring to the appended figures, wherein.

DETAILED DESCRIPTION OF THE INVENTION

Figure 1:
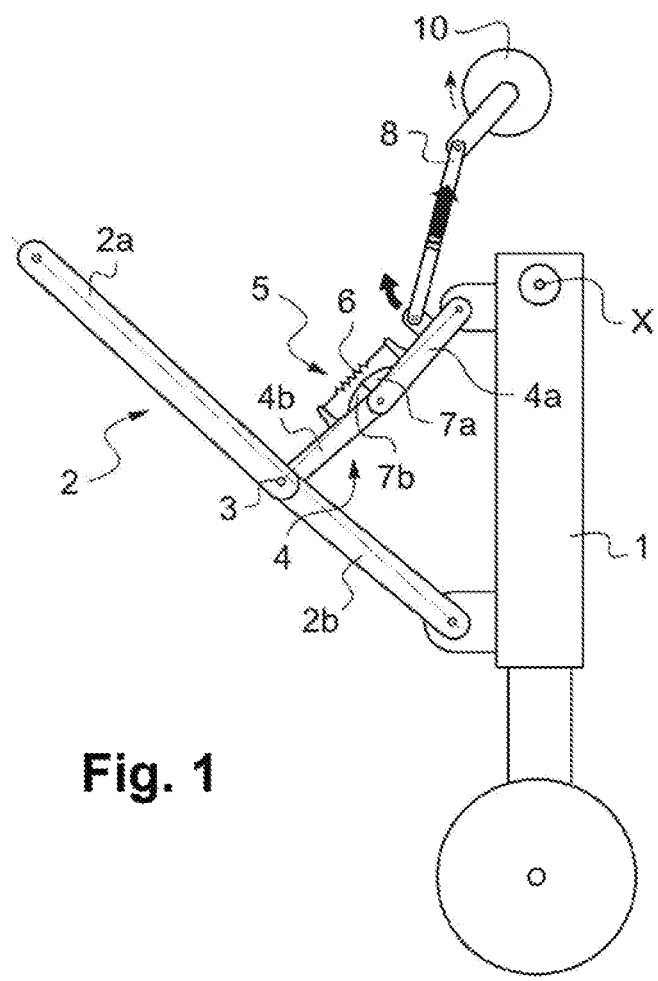
FIG. 1 is a side view of a landing gear applying the provisions of the invention, shown here in the deployed position.

First of all, with reference to FIG. 1, the landing gear has in a known manner a leg 1 articulated to the aircraft structure along an articulation axis X (seen here at the end) to be movable between a deployed position illustrated here in which the landing gear is brought before landing, and a retracted position which is that of the in-flight landing gear.

A breaker strut 2 is articulated on one side on the leg 1 and on the other side on the aircraft structure. The breaker brace 2 consists of two connecting rods 2a, 2b, articulated to each other at a knee 3. The connecting rod 2a is also articulated on the aircraft, while the connecting rod 2b is articulated on the leg 1. The breaker strut 2 is stabilized in a substantially aligned position by means of a stabilization member 4 comprising two linkages 4a, 4b, also articulated to each other. The linkage 4a is articulated on the leg 1, and the linkage 4b is articulated on the strut 2. The linkages 4a, 4b are held in a substantially aligned position by a locking member 5 with return springs 6 resetting the linkages 4a, 4b to the locking position defined by stops 7a, 7b.

Thus stabilized, the breaker strut 2 prevents any rotation of the leg 1 around its articulation axis X, so that the deployed position is a stable position. As is well known, the connecting rods 2a, 2b and the linkages 4a, 4b are designed so that to achieve the locked position shown here, the connecting rod joint knee and the linkage joint knee slightly exceed the geometric alignment shown by the broken lines.

Figure 2:
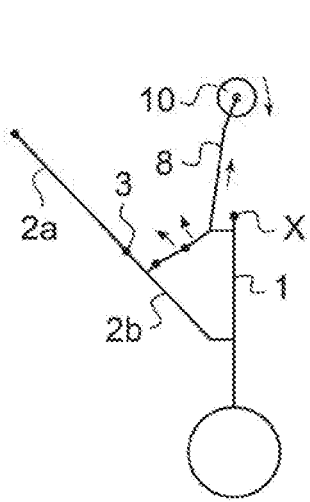
FIG. 2 is a skeletal side view of the landing gear in FIG. 1 in the deployed position.

An electromechanical operating actuator 10 is located on the aircraft structure to be coupled to the linkage 4a of the stabilizer 4, which is articulated on the leg 1. Here, the electromechanical operating actuator 10 is of the rotary type and has a crank handle 11 which is attached to the linkage 4a by means of a rod 8. The operation of the assembly is now explained while referring to FIGS. 2 to 4. When the landing gear has to be lifted back into the retracted position, the electromechanical operating actuator 10 is activated. It pulls the linkage 4a (see arrow), which causes it to rotate around its axis of rotation on the leg, thus breaking the alignment of the linkages 4a, 4b against the action of the return springs 6 of the locking member 5.

Figure 3:
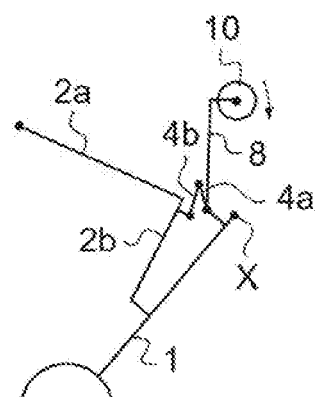
FIG. 3 is a skeletal side view of the landing gear in FIG. 1 in a position intermediate between the deployed and retracted position.

As the linkage 4b is attached to the strut 2, the alignment of the connecting rods 2a, 2b is also broken. The landing gear is thus unlocked and can be rotated around its hinge axis under the action of the electromechanical operating actuator 10, as shown in FIG. 3. While the electromechanical operating actuator 10 continues to rotate the linkage 4a, it drives the other rod 4b, the rods 2a, 2b of the strut 2, and finally the leg 1 of the landing gear. All these elements are linked together so that an angular position of the linkage 4a corresponds to one and only one position of each of these elements.

Figure 4:
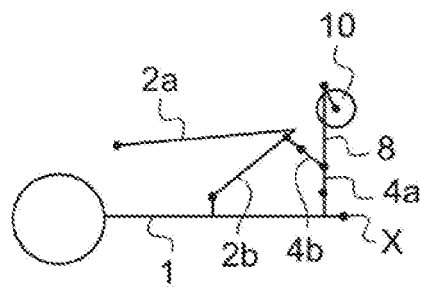
FIG. 4 is a skeletal side view of the landing gear of FIG. 1 in the retracted position.

The movement continues to the position shown in FIG. 4, in which the leg 1 has reached the retracted position. It is important to ensure that when the landing gear moves from its deployed position to its retracted position, the linkage 4a moves continuously and without singularity, so that the movement of the leg can be ensured by means of a continuous action and always in the same direction as the electromechanical operating actuator 10 on the linkage 4a.

Thus, with a single electromechanical actuator, the stabilizing member is misaligned, causing the strut to misalign and, consequently, the leg to move. For the lowering of the landing gear into the deployed position, it may be carried out under the effect of gravity, the electromechanical operating actuator 10 being controlled to regulate the lowering speed of the landing gear. Indeed, the movement of the linkage 4a, which is continuous and without singularity in the direction of lifting, is therefore continuous and without singularity in the direction of lowering, so that the electromechanical operating actuator 10 is always driven in the same direction when the landing gear is lowered and therefore operates as a generator, and can therefore be used as a brake when lowering. To do this, it is of course necessary for the electromechanical operating actuator 10 to be reversible and able to be driven by the linkage 4a when the landing gear is lowered.

Figure 5:
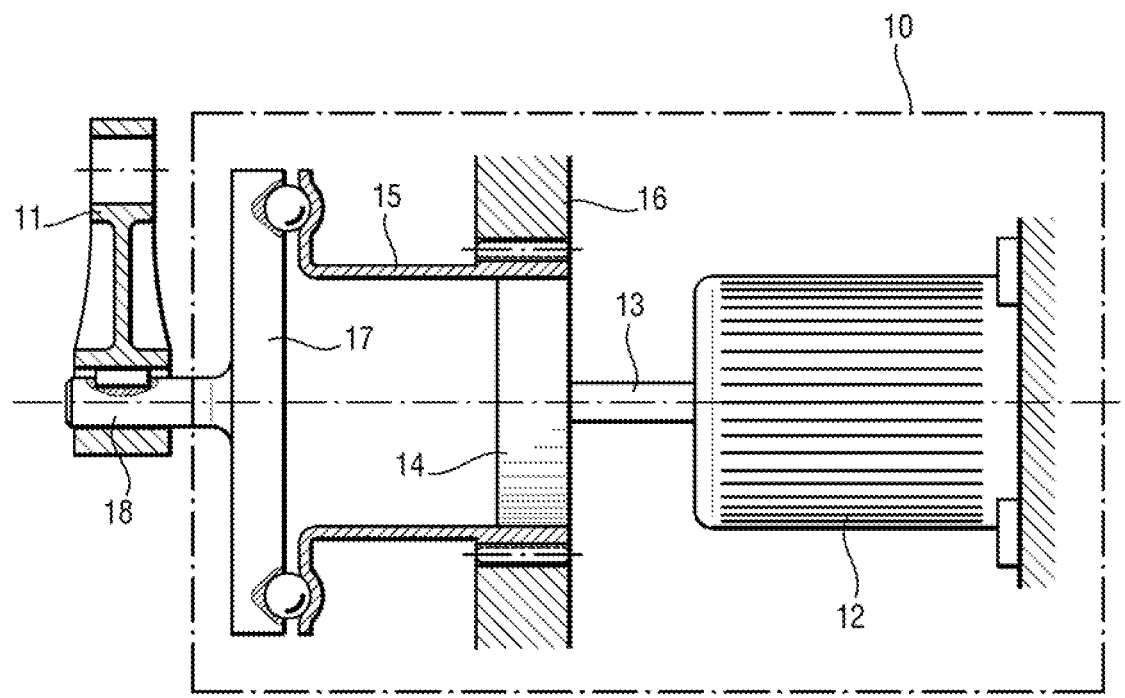
FIG. 5 is a schematic view of the inside of the electromechanical operating actuator associated with the landing gear in FIG. 1, according to a first alternative embodiment.

As shown in FIG. 5, the electromechanical operating actuator 10 is a deformation wave type geared motor, also known as a "harmonic drive". This type of electromechanical actuator can have a high reduction ratio while remaining reversible. Conversely, when the electromechanical operating actuator 10 is driven when the landing gear is lowered, this reduction ratio becomes a multiplication ratio, so that the rotor of the electromechanical actuator motor is driven at high speed.

Under special circumstances, the electro-mechanical operating actuator 10 may not slow the lowering of the landing gear to the deployed position, for example in the event of an electrical failure. The landing gear can reach the deployed position at a high speed, and stopping in this position can be abrupt. Due to the high reduction ratio, the inertia of the motor rotor is high. And its sudden stop can generate high forces, which can damage the electromechanical actuator 10. According to the invention, a shock absorber is inserted into the electromechanical actuator to reduce the risk of damage thereto following a rapid reaching of the landing gear in the deployed position.

More specifically, the electromechanical actuator 10 as shown in FIG. 5 has a motor 12 driving a motor shaft 13 driving a wave generator 14. This cooperates with a deformable bowl 15 having teeth on its periphery which are forced by the wave generator 14 to cooperate in two diametrically opposed places with teeth of a crown 16 carried by the housing of the electromechanical actuator. The deformable bowl 15 has a slightly smaller number of teeth than the number of teeth of the crown 16, which has the effect of rotating the deformable bowl 15 in the direction opposite that of the wave generator 14, at a much lower angular velocity. The crank handle 11 is carried by an output shaft 18 which is attached to the deformable bowl 15 via a damping device 17 (e. g. sliding plate type, ball type, or any other type of damping device). This damping device 17 filters out any vibration during normal operation of the electromechanical actuator, and considerably reduces the consequences of a sudden stop of the landing gear in the deployed position, by protecting the motor 12, and in particular its rotor.

Figure 6:
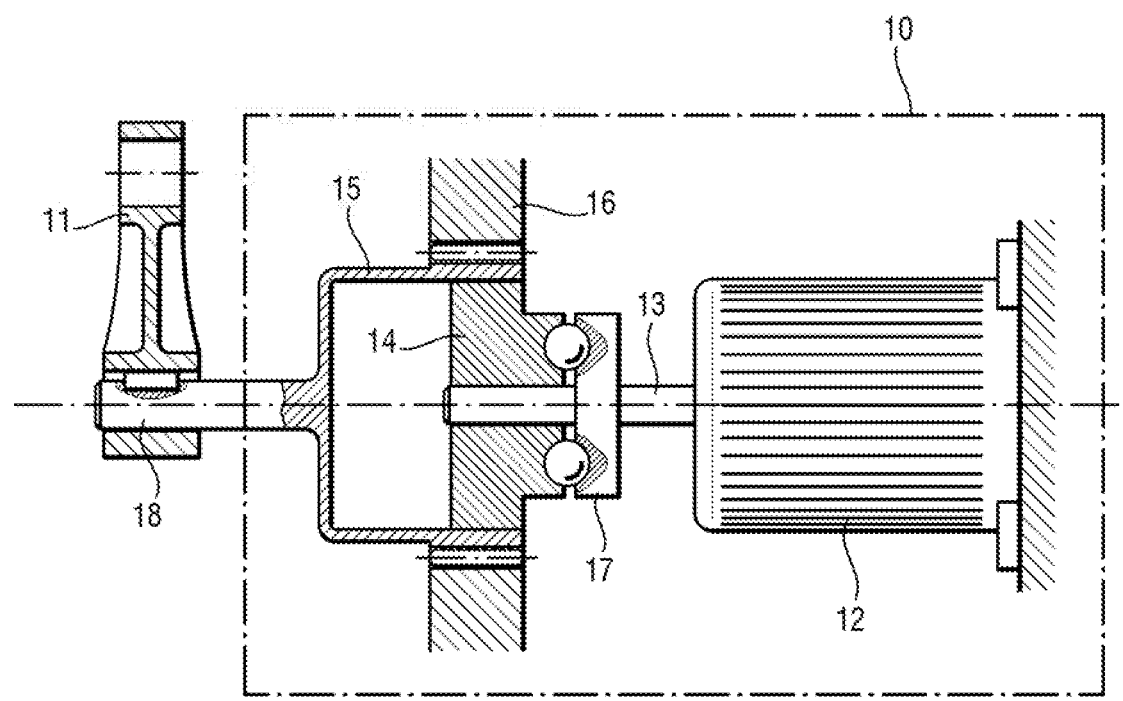
FIG. 6 is a schematic view of the inside of the electromechanical operating actuator associated with the landing gear in FIG. 1, according to a second alternative embodiment.
Figure 7:
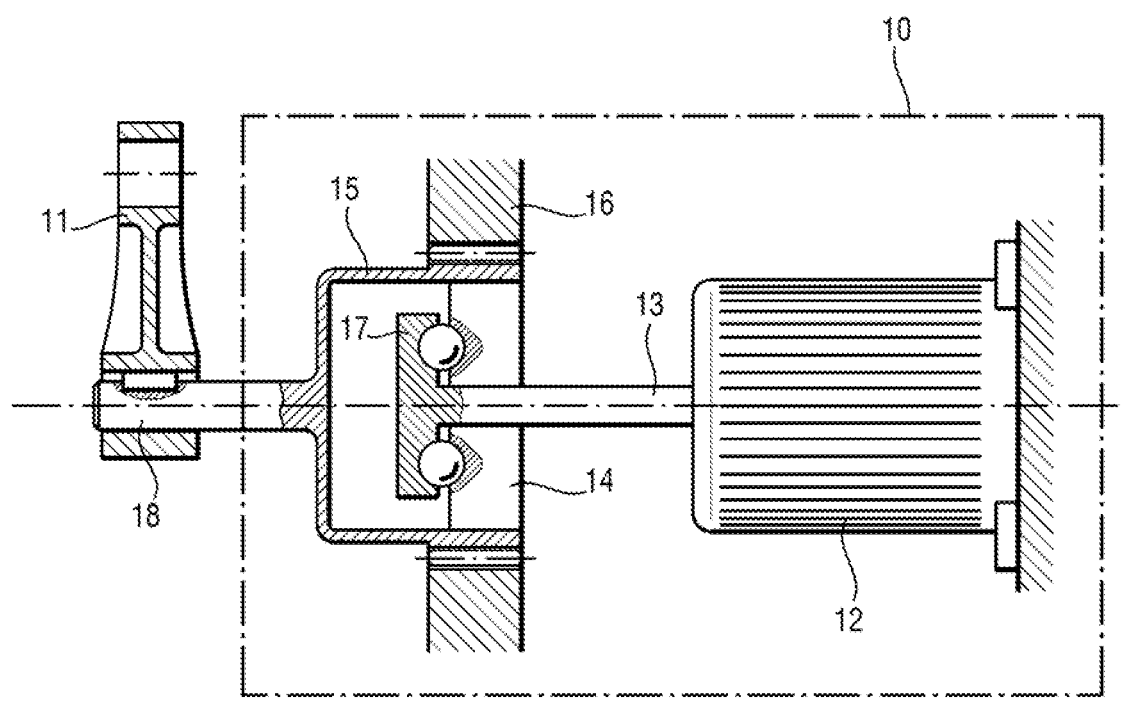
FIG. 7 is a schematic view of the inside of the electromechanical operating actuator associated with the landing gear in FIG. 1, according to a third alternative embodiment.

According to an alternative embodiment shown in FIG. 6, the damping device 17 is now placed between the motor shaft 13 of the motor 12 and the wave generator 14. The deformable bowl 15 is here directly connected to the output shaft 18 which carries the crank handle 11. According to yet another alternative embodiment shown in FIG. 7, the damping device 17 is still placed between the motor shaft 13 of the motor 12 and the wave generator 14, but this time extending inside the deformable bowl 15.

Thus, thanks to the arrangement of an internal damping device in the electro-mechanical deformation wave actuator, the advantages of this type of electromechanical actuator are enjoyed while protecting it from any sudden stops due to the rapid fall of the landing gear to the deployed position.

The invention is not limited to what has just been described, but encompasses every alternative solution within the scope of the claims.

In particular, the invention is not limited to the operation of a landing gear with a breaker strut and an align locking member. It applies to the operation of a landing gear designed to be operated by a single electromechanical actuator capable of operating the landing gear alone between the deployed and retracted positions.

The invention claimed is:

1. A method for protecting an aircraft landing gear against stroke-end shocks wherein the landing gear is maneuverable between a retracted position and a deployed position by a single electromechanical actuator comprising:
a motor having a motor shaft,
an output shaft coupled to the aircraft landing gear, and
a strain wave gear arranged between the motor shaft and the output shaft, the method comprising:
equipping the single electromechanical actuator, in addition to the strain wave gear, with an internal rotary damper arranged between the output shaft and the strain wave gear or between the motor shaft and the strain wave gear to protect the motor from any sudden stops of said output shaft of the single electromechanical actuator.

2. The method according to claim 1, wherein the strain wave gear comprises a wave generator which cooperates with a deformable bowl forced to cooperate in two diametrically opposed places with a crown, and the internal rotary damper is inserted between the deformable bowl and the output shaft of the single electromechanical strain wave gearing operating-actuator.

3. The method according to claim 1, wherein the strain wave gear comprises a wave generator which cooperates with a deformable bowl forced to cooperate in two diametrically opposed places with a crown, and the internal rotary damper is inserted between the motor shaft and the wave generator of the single electromechanical actuator.

4. The method according to claim 3, wherein the internal rotary damper is arranged inside the deformable bowl of the single electromechanical actuator.

5. An aircraft landing gear maneuverable between a retracted position and a deployed position, the aircraft landing gear comprising:
a single electromechanical actuator for moving the landing gear between the retracted and deployed positions, wherein the single electromechanical comprises:
a motor having a motor shaft,
an output shaft coupled to the aircraft landing gear,
a strain wave gear arranged between the motor shaft and the output shaft, and
an internal rotary damper arranged between the output shaft and the strain wave gear or between the motor shaft and the strain wave gear to protect the motor from any sudden stops of said output shaft of the single electromechanical actuator.

6. A method for protecting an aircraft landing gear against stroke-end shocks, the landing gear being manoeuvrable between a retracted position and a deployed position by a single electromechanical actuator comprising:
a motor having a motor shaft,
an output shaft coupled to the aircraft landing gear, and
a strain wave gear arranged between the motor shaft and the output shaft, the method comprising:

equipping the single electromechanical actuator, in addition to the strain wave gear, with an internal rotary damper arranged between the output shaft and the strain wave gear or between the motor shaft and the strain wave gear to absorb high forces generated by a sudden stop of said output shaft of the single electromechanical actuator.

7. A method for protecting an aircraft landing gear against stroke-end shocks, the landing gear being manoeuvrable between a retracted position and a deployed position by a single electromechanical actuator comprising:
   a motor having a motor shaft,
   an output shaft coupled to the aircraft landing gear, and
   a strain wave gear arranged between the motor shaft and the output shaft, the method comprising:
   equipping the single electromechanical actuator, in addition to the strain wave gear, with an internal rotary damper arranged between the output shaft and the strain wave gear or between the motor shaft and the strain wave gear to prevent a sudden stop of said output shaft of the single electromechanical actuator from causing a sudden stop of the motor shaft.

8. The method of claim 1, wherein the internal rotary damper absorbs any sudden stops of the output shaft of the single electromechanical actuator.

9. The aircraft landing gear of claim 5, wherein the internal rotary damper absorbs any sudden stops of said output shaft of the single electromechanical actuator.

10. The method of claim 6, wherein the internal rotary damper absorbs high forces generated by a sudden stop of said output shaft of the single electromechanical actuator.

\* \* \* \* \*